(12) United States Patent
Pfau et al.

(10) Patent No.: US 9,739,652 B2
(45) Date of Patent: Aug. 22, 2017

(54) SENSOR AND FLOW MEASURING DEVICE

(71) Applicant: Endress + Hauser Flowtec AG, Reinach (CH)

(72) Inventors: Axel Pfau, Aesch (CH); Achim Wiest, Weil am Rhein (DE); Martin Barth, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 152 days.

(21) Appl. No.: 14/442,801

(22) PCT Filed: Oct. 28, 2013

(86) PCT No.: PCT/EP2013/072503
§ 371 (c)(1),
(2) Date: May 14, 2015

(87) PCT Pub. No.: WO2014/075905
PCT Pub. Date: May 22, 2014

(65) Prior Publication Data
US 2015/0292928 A1    Oct. 15, 2015

(30) Foreign Application Priority Data

Nov. 16, 2012   (DE) .................. 10 2012 111 058

(51) Int. Cl.
*G01F 1/684*     (2006.01)
*G01F 1/69*      (2006.01)

(52) U.S. Cl.
CPC ............ *G01F 1/6842* (2013.01); *G01F 1/684* (2013.01); *G01F 1/69* (2013.01)

(58) Field of Classification Search
CPC ..................................................... G01F 1/6842

(Continued)

(56) References Cited

U.S. PATENT DOCUMENTS 3,335,606 A    8/1967   Scarpa
4,972,708 A *  11/1990  Wiegleb .................. G01P 5/12
                                              338/28

(Continued)

FOREIGN PATENT DOCUMENTS

DE           10019991 A1    1/2002
DE         102010061731 A1    5/2012
(Continued)

OTHER PUBLICATIONS

English Translation of the International Preliminary Report on Patentability, WIPO, Geneva, CH, May 28, 2015.

(Continued)

*Primary Examiner* — Ryan Walsh
(74) *Attorney, Agent, or Firm* — Bacon & Thomas, PLLC

(57) ABSTRACT

A sensor of a thermal flow measuring device, as well as the flow measuring device itself. The sensor comprises a sensor platform, which bears at least one measuring sensor element and a heated sensor element. Each of the at least two sensor elements is surrounded by a metal sleeve, which protrudes from the sensor platform. The sensor has a plate-shaped element, which defines a plane, whose axis extends parallel to the axis of at least one of the metal sleeves, wherein the plane is spaced from the sensor platform in the axial direction of the metal sleeve. The metal sleeve with the heated sensor element has a terminal end face and the plate-shaped element is provided along the end face of the metal sleeve with the heated sensor element for flow guidance.

12 Claims, 3 Drawing Sheets

(58) Field of Classification Search
USPC .................................................... 73/204.21
See application file for complete search history.

(56) References Cited

U.S. PATENT DOCUMENTS

| | | | |
|---|---|---|---|
| 5,848,094 A * | 12/1998 | Buhl | ..................... G01F 1/684 |
| | | | 374/147 |
| 8,899,830 B2 | 12/2014 | Pfau | |
| 2005/0223828 A1 * | 10/2005 | Olin | ..................... G01F 1/6842 |
| | | | 73/866.5 |
| 2012/0144928 A1 | 6/2012 | Wible | |
| 2012/0192619 A1 * | 8/2012 | Muziol | ................... G01F 1/684 |
| | | | 73/23.31 |
| 2015/0308875 A1 * | 10/2015 | Muller | ................... G01F 1/692 |
| | | | 73/204.26 |

FOREIGN PATENT DOCUMENTS

EP          2455725  A1    5/2012
WO       2012012769  A2    1/2012

OTHER PUBLICATIONS

German Search Report, German Patent Office, Munich, DE, May 14, 2013.
International Search Report, EPO, The Netherlands, Apr. 2, 2014.

* cited by examiner

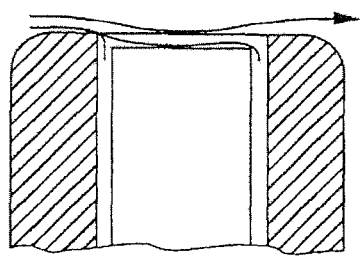
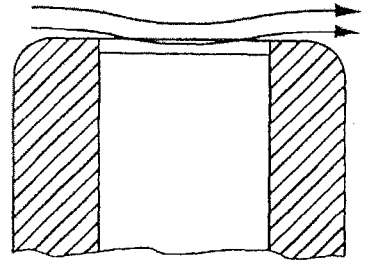
Fig. 5a    Fig. 5b
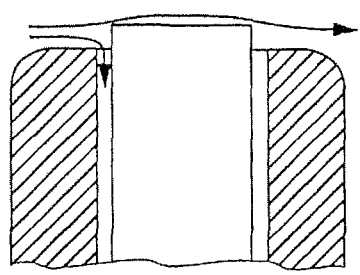
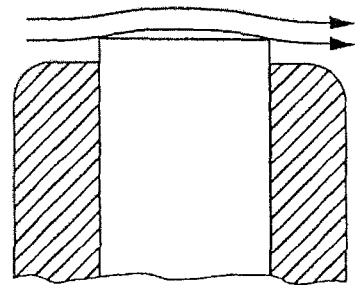
Fig. 5c    Fig. 5d
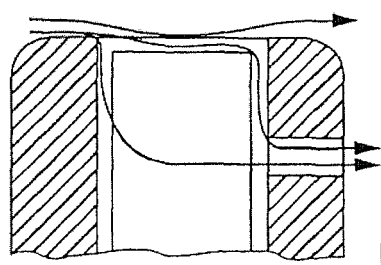
Fig. 5e

SENSOR AND FLOW MEASURING DEVICE

TECHNICAL FIELD The invention relates to a sensor for a flow measuring device, as well as to a flow measuring device.

BACKGROUND DISCUSSION

Known for flow measuring devices are sensors, which work according to the thermal measuring principle. This measuring principle is based on the cooling of a heated resistance thermometer, subsequently referred to as the heated sensor element, from which heat is withdrawn by the flowing measured medium. The withdrawn energy is compensated by increasing the electrical heating current. In this way, a constant temperature difference between the heated sensor and a reference sensor is established. The reference sensor is referred to herein as the measuring sensor element. The greater the mass flow, the more energy is required, in order to maintain this difference in temperature. The measured heating current is, as a result thereof, proportional to the mass flow. The thermal measuring principle is well established in processes, in which a product is made from a raw or starting material by the application of chemical, physical or biological procedures and is applied in numerous applications successfully. Especially demanding is the application of the measuring principle in water, since in such case the heat transfers and the required heating power are highest. In the case of small separation of the sensor elements from one another, crosstalk of the heated sensor element to the temperature measuring sensor element can be experienced, especially in the water flow velocity range above 2.5 m/s.

There are sensors known, which are composed of two sensor elements, a heated sensor element and a measuring sensor element, each of which has a cylindrical sensor cap and extends from a base surface of a sensor. Resistance sensors are soldered in the end faces of the sensor caps. Due to the cylindrical sensor caps, the sensor elements already have a good thermal insulation. These sensors, however, behave poorly in water, as compared with the earlier mentioned sensors. Thus, their characteristic curve exhibits in the case of rising flow a degree of saturation, such that, in spite of higher velocity, no more heat can be expelled into the flow. In such case, the Nusselt number, which describes the heat transfer as a dimensionless number, is too high.

Published International Application, WO 2012/012769 discloses a sensor, which has a cast-on encasement, which extends to the ends of two metal sleeves. These metal sleeves are, however, full surfaced, thus also heated in the region of their lateral surfaces. The encasement serves in this connection for shielding a part of the heating surface.

SUMMARY OF THE INVENTION

It is, consequently, an object of the present invention to provide a sensor, which enables a more optimized flow of a medium to be measured onto at least one of the sensor elements.

According to the invention, a sensor of a thermal flow measuring device includes a sensor platform, which bears at least a measuring sensor element and a heated sensor element, wherein each of the at least two sensor elements is surrounded by a metal sleeve, which protrudes from the sensor platform, wherein the sensor has a plate-shaped element, which defines a plane, whose axis extends parallel to the axis of at least one of the metal sleeves and wherein the plane is spaced from the sensor platform in the axial direction of the metal sleeve, characterized in that the metal sleeve with the heated sensor element has a terminal end face and the plate-shaped element is provided along the end face of the metal sleeve with the heated sensor element for flow guidance, wherein at least 50% of the heating power required for the heated sensor element is given off as heat energy via the metal sleeve to a medium in a region, which is formed by the terminal end face and a sleeve wall section, which starting from the end face lies in the first third of the metal sleeve.

By targeted correcting of heat to the end face of the active temperature sensor, respectively the heated sensor element, a more optimized heat transfer can occur, especially to liquids, at the end face of the metal sleeve.

On the whole, sensitivity and flow measuring range are increased, preferably also for liquids with a flow velocity of greater than 2.5 m/s, in that the heat transfer (Nusselt number) present locally on the end face is lessened by the added on structure, in the form of the plate-shaped element, and a continuous characteristic up to high velocities is achieved.

In such case, the aforementioned plate-shaped element can be embodied especially as a sensor cap, which is preferably pluggable onto the metal sleeves.

For a lowest possible energy and disturbance free manner of operation, it is advantageous when at least 70%, especially at least 80%, of the heating power required for the heated sensor element is given off as heat energy via the metal sleeve to a medium in a region, which is formed by the terminal end face and a sleeve wall section, which starting from the end face lies in the first third of the metal sleeve.

An as targeted as possible heat input is achieved in that at least 50% of the heating power required for the heated sensor element is given off as heat energy via the metal sleeve to a medium in a region, which is formed by the terminal end face and a sleeve wall section, which starting from the end face lies in the first sixth of the metal sleeve.

An especially optimal flow guidance is achieved over the end face of one of the metal sleeves when at least 25%, preferably at least 50%, especially preferably at least 80%, of the plate-shaped element is planar.

This planar region can advantageously be at an angle between 75-105°, preferably 85-95°, especially perpendicular, to the axis of the metal sleeve.

The metal sleeve of the active temperature sensor can, depending on special variants of the arrangement of the plate-shaped element, be protruding or set back from the plane. It is, however, advantageous when the one or more sensors is embodied in such a manner that the plate-shaped element is spaced from the metal sleeve, especially in the axial direction, by less than a diameter, preferably less than a half diameter, of such metal sleeve.

Depending on flow velocity, a blockage of medium can build up before the end face of the metal sleeve. In order to compensate for this effect, it is advantageous that there be between the metal sleeve and the plate-shaped element a slit, especially an annular gap.

An improved flow guidance is achieved especially in the case of a width and/or length of the plate-shaped element between 2-9 mm, preferably between 3-6 mm.

Since sharp edges would lead to undesired vortices, the plate-shaped element has for mounting on the sensor platform either a cylindrical wall or rounded posts.

In a preferred embodiment, the plate-shaped element is concave. This enabled a better guiding of the medium onto the end face of the metal sleeve, such that the medium has only a low flow velocity.

For a space and material saving construction and in order to avoid crosstalk from the heated to the measuring sensor element, it is advantageous when the diameter of the metal sleeve with the heated sensor element is larger, preferably at least 1.5-times larger, then the diameter of the metal sleeve with the measuring sensor element.

According to the invention, a thermal flow measuring device includes a sensor as claimed in claim 1, especially for ascertaining the mass flow of a liquid. Especially in the case of the flow measurement of water with velocities of over 2.5 m/s, the sensitivity of the measuring can be increased.

BRIEF DESCRIPTION OF THE DRAWINGS

A number of examples of embodiments of the invention will now be described in greater detail based on the drawing, the figures of which show as follows:

FIGS. 5a-5e are schematic representations of the flow guidance provided by the flow cap.

DETAILED DISCUSSION IN CONJUNCTION WITH THE DRAWINGS

Figure 1:
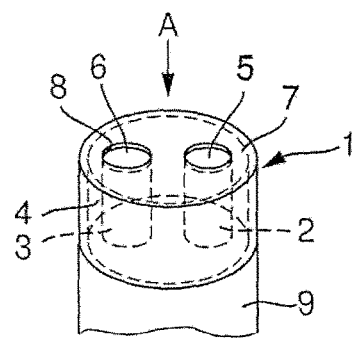
FIG. 1 is a perspective view of a first sensor of the invention for a thermal flow device.

FIG. 1 shows a sensor for a thermal flow measuring device and embodied as a thermal, mass flow sensor 1.

Conventional thermal flow measuring devices usually have two temperature sensors, which are embodied as equally as possible. They are arranged, most often, in pin-shaped, metal sleeves, so-called stingers, or in cylindrical, metal sleeves and are in thermal contact with the medium flowing through a measuring tube or through a pipeline. For industrial application, the two temperature sensors are usually installed in a measuring tube; the temperature sensors can, however, also be mounted directly in the pipeline. One of the two temperature sensors is a so called active temperature sensor, which is heated by means of a heating unit. Provided as heating unit is either an additional resistance heater, or the temperature sensor is a resistance element, e.g. an RTD (Resistance Temperature Device) sensor, which is heated by conversion of electrical power, e.g. by a corresponding variation of the electrical current used for measurement. The second temperature sensor is a so-called passive temperature sensor, which measures the temperature of the medium.

Usually, the heated temperature sensor in a thermal flow measuring device is so heated that a fixed temperature difference is established between the two temperature sensors. Alternatively, it is also known to supply a constant heating power via a control unit.

If there is no flow in the measuring tube, then a time constant amount of heat is required for maintaining the predetermined temperature difference. If, in contrast, the medium to be measured is moving, then the cooling of the heated temperature sensor essentially depends on the mass flow of the medium flowing past. Since the medium is colder than the heated temperature sensor, the flowing medium transports heat away from the heated temperature sensor. In order thus in the case of a flowing medium to maintain the fixed temperature difference between the two temperature sensors, an increased heating power is required for the heated temperature sensor. The increased heating power is a measure for the mass flow, respectively the mass flow of the medium through the pipeline.

If, in contrast, a constant heating power is fed in, then the temperature difference between the two temperature sensors lessens as a result of the flow of the medium. The particular temperature difference is then a measure for the mass flow of the medium through the pipeline, respectively through the measuring tube.

There is, thus, a functional relationship between the heating energy needed for heating the temperature sensor and the mass flow through a pipeline, respectively through a measuring tube. The dependence of the heat transfer coefficient on the mass flow of the medium through the measuring tube, respectively through the pipeline, is used in thermal flow measuring devices for determining mass flow. Devices, which operate on this principle, are manufactured and sold by the applicant under the marks, 't switch', 't trend' or 't mass'.

FIG. 1 shows a mass flow sensor 1 having a cylindrical sensor platform 9. In the mass flow sensor 1 illustrated in FIG. 1 for a thermal flow device, two temperature sensors (not shown) are surrounded, in each case, with a cylindrical metal sleeve 2, 3. The temperature sensors are a heated sensor element, respectively an active temperature sensor, which enables a variable heat input into the medium, and a measuring sensor element, respectively a passive temperature sensor, which registers the temperature of the medium.

Alternatively, such as above described, the heated sensor element can also be fed a constant heating power.

The metal sleeves 2, 3 extend in the axial direction from the sensor body 9. In such case, the temperature sensors are preferably secured with solder internally on the respective metal sleeves 2, 3. The temperature sensors are, in such case, formed in such a manner that heat transfer occurs essentially on an end face, respectively frontal area, 5, 6 of the respective metal sleeves 2, 3, while the lower part of the metal sleeves extending toward the sensor platform 9 has no contact with the temperature sensors. This lower part serves only for cable guidance for the temperature sensors fixed to the end faces 5, 6. The metal sleeves end on or in the sensor platform 9 on or in a metal plate, which is connected with the sensor platform 9 and assures a secure mounting of the metal sleeves 5, 6. In such case, the temperature sensors, thus both the active temperature sensor as well as also the passive temperature sensor, are arranged in such a manner in the cylindrical metal sleeves that at least the respective frontal areas 5 and 6 of the metal sleeves have an as constant as possible temperature over the respective total terminal areas 5, 6. Shielding effects do not occur, in such case, along the end faces 5, 6. Due to this construction, greater than 80% of the heating power is transmitted to a medium flowing past in the front region, especially in the front third, of the metal sleeve 5 of the heated temperature sensor in the form of heat energy.

The ascertaining of the temperature of the medium by the passive temperature sensor occurs, thus, also in the front third of the metal sleeve 6. In such case, the frontal area 5 of the metal sleeve 2, in which the active temperature sensor is positioned, has a higher temperature than the frontal area 6 of the metal sleeve 3, in which the passive temperature sensor is positioned.

Such mass flow sensors for thermal, flow devices are known per se and deliver sufficient measurement results. Forming along the end, side area of the metal sleeve 2, in such case, is a thermal boundary layer between the flowing medium and the sensor, respective the metal sleeve 2. This interface promotes good heat transfer between medium and sensor.

In order, however, to achieve an improved heat transfer, especially in the case of liquids, it has proved to be especially favorable, to provide an as broad as possible interface. This interface extends according to the invention over one or both end faces 5, 6 of the metal sleeves 2, 3—especially the metal sleeve 2 of the active temperature sensor—in the horizontal direction and enables a flow guidance along the end face 5 of the metal sleeve 2 of the active temperature sensor.

The forming and/or increasing of this interface can be achieved by a crown, respectively a cap 4, in that a plate-shaped element 7 is provided on the end of the crown, which extends parallel to end face 5 and/or 6 of at least one of the metal sleeves 2 and/or 3. In such case, the plate-shaped element 7 can also have bulges. In the present example of an embodiment, it is, however, planar.

In the example of an embodiment shown in FIG. 1, the frontal plate-shaped element 7 forms a planar end of a cylindrical cap 4. Between the plate-shaped element 7 and the ends of the metal sleeves 2 and 3 are free spaces 8 in the form of circularly round slits, respectively annular gaps, which enable a sucking out of the flow and, thus, especially a better guidance of the flow at the end region 5 the metal sleeve 2 of the active temperature sensor. Corresponding examples of flow guidance by the flow cap, respectively its plate-shaped element 7, are shown in FIGS. 5*a-e*. Depending on embodiment of the annular gaps between the plate-shaped element and metal sleeves, different heat transfer conditions can be produced on an active area.

In the examples of embodiments of FIGS. 1-4, the flow could experience a small flow blockage before striking the end face 5 of the metal sleeve 2. In order to achieve a leveling off and ideally a complete elimination of this flow blockage, a part of the flow can be sucked out and/or detoured through circularly round slits between the metal sleeve and the crown. These slits are only suggested in the figures and also shown in more detail in the case of the examples of embodiments in FIGS. 2-4.

The frontal plate-shaped element 7 of the cap 4 defines, in such case, a plane, preferably a rotationally symmetric plane, which extends perpendicularly to the axis of the metal sleeve 2 of the active temperature sensor and whose axis is parallel to such axis of the metal sleeve 2.

The outer diameter of the cap 4 amounts to preferably at least twice, preferably at least three times, the diameter of the metal sleeves 2 or 3.

Figure 2A:
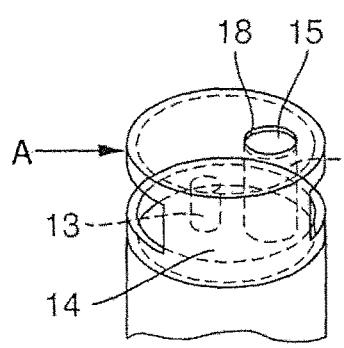
FIGS. 2a-2c are perspective views, front view and side view, of a second sensor.
Figure 2B:
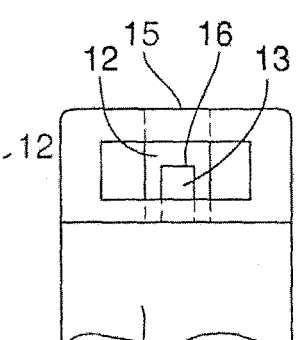
Figure 2C:
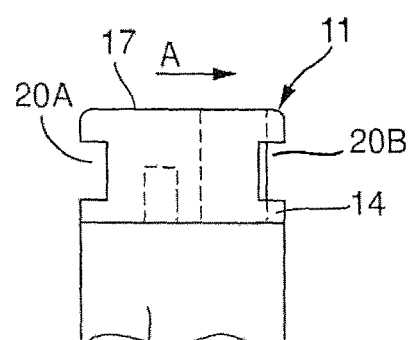

FIGS. 2*a-c* show a thermal, mass flow sensor 11 with two, differently formed, metal sleeves 12 and 13. A first of the two metal sleeves 12 is wider, preferably at least 1.5 times wider, then the second of the two metal sleeves 13. Installed in the first metal sleeve 12 is an active temperature sensor, while the second metal sleeve 13 has a passive temperature sensor. The second metal sleeve is short compared with the first metal sleeve, i.e. the end face 16 of the second metal sleeve 13 is less far from the platform 19 of the mass flow sensor 11 then the end face 15 of the first metal sleeve 12. Preferably, the end face 15 of the first metal sleeve 12 is at least 1.5-times farther from the platform 19 of the mass flow sensor 11 then the end face 16 of the second metal sleeve 13. Not shown also in this example of an embodiment is that a respective temperature sensor is, in each case, plate-shaped and that its surface either directly lies against the inner side of the end face 15, 16 of the metal sleeve 12, 13 or is fixed by means of solder on the inner side of the end face. In such case, the height of the temperature sensor in the axial direction of the metal sleeve 12, 13 amounts to less than ¼ the diameter of the temperature sensor. On the whole, a large part, at least over 50%, of the heat input into the flowing medium occurs via the end face 15, respectively the frontal area, of the metal sleeve 12 with the therein arranged active temperature sensor. This arrangement of the temperature sensors in the metal sleeves 12, 13 is, in principle, the same for all examples of embodiments shown in FIGS. 1-4.

The thermal, mass flow sensor 11 includes a crown, respectively a cap, 14, by which a terminal, plate-shaped element 17 is provided, which extends parallel to end faces 15 and/or 16 of at least one metal sleeve 12 and/or 13.

This frontal plate-shaped element 17 extends in the concrete case of FIG. 2 in the same plane as the end face 15 the first metal sleeve 12. The setback of end face 16 of the second metal sleeve 3 is arranged below between the plate-shaped element 17 and the platform 19 of the mass flow sensor 11. Obtaining improved heat transfer depends essentially on forming a boundary layer in the region of the active temperature sensor and the metal sleeve 12 surrounding it. Therefore, the boundary layer essentially in the region of the first metal sleeve should be changed. Moreover, the ascertaining of the temperature of the medium is accomplished by the passive temperature sensor and the metal sleeve 13 surrounding it.

Cap 14 includes additionally two openings 20*a*, 20*b*, through which medium approaches and leaves the metal sleeve 13, in order to enable ascertaining of the temperature of the medium. In such case, the flow direction of the medium to be measured extends in such a manner that through the flow through an opening 20*a*, first of all, the metal sleeve 13 of the passive temperature sensor and then the metal sleeve 12 of the active temperature sensor are flowed onto, and then the medium leaves through the opening 20*b* of the cap 14. The two metal sleeves 12, 13 are, thus, arranged one after the other in the flow direction.

Figure 3:
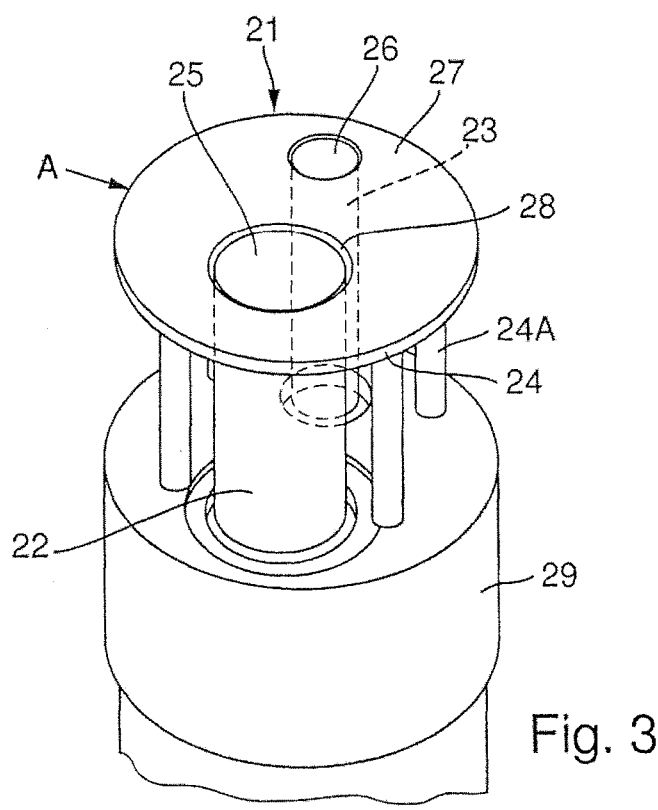
FIG. 3 is a perspective view of a third sensor.

FIG. 3 shows another embodiment of a thermal, mass flow sensor 21 having a cylindrical sensor platform 29. In this embodiment, for expansion of the interface, the crown is embodied as a flat, plate-shaped element, which is connected with the platform 29 via four rounded posts 24*a*. As in the preceding example of an embodiment, the first metal sleeve 22 of the active temperature sensor is wider than the second metal sleeve 23, in which the passive temperature sensor is arranged. Other than it the preceding example of an embodiment, however, the end faces 25 and 26 are located in one plane. The end faces 25 and 26 of the metal sleeves 22 and 23 can either slightly protrude from the plate-shaped element 27 or be set back from the plate-shaped element 27 or be situated in the plane of the plate-shaped element 27. Also, in this example of an embodiment, annular gaps 28 exist between the plate-shaped element 27 and the metal sleeves 22, 23.

The rounded posts 24*a* enable an especially advantageous heat removal from the metal sleeve 22 of the active temperature sensor, so that there is no thermal feedback to the metal sleeve 23 of the passive temperature sensor via the shared platform.

Figure 4:
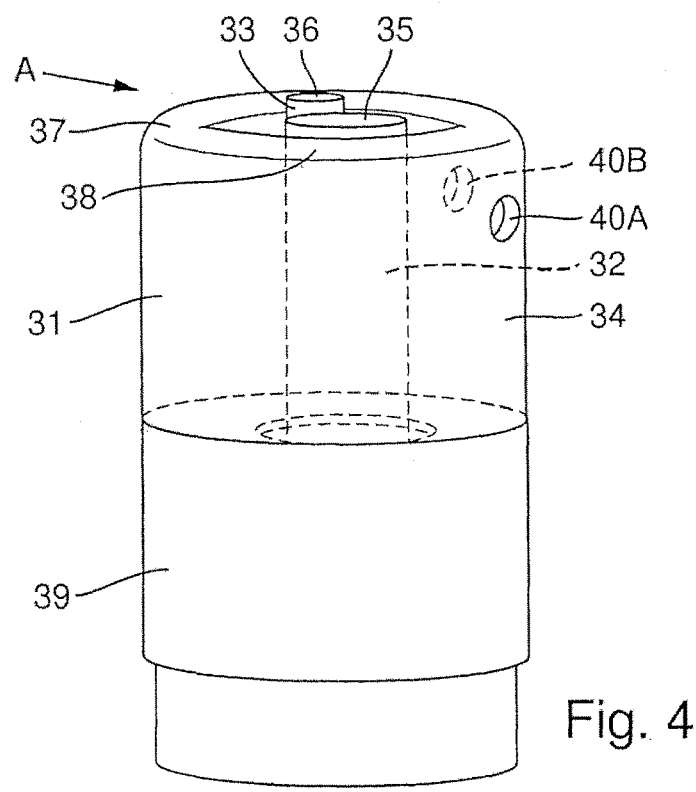
FIG. 4 is a rotated side view of a fourth sensor.

FIG. 4 shows a further example of an embodiment of a thermal, mass flow sensor 31. This embodiment has two equally long, cylindrical, metal sleeves 32, 33, in which, respectively, an active and a passive temperature sensor are arranged on the end faces 35 and 36 of the respective metal sleeves 32, 33 in the sleeve interiors. In such case, the metal sleeves have different diameters, wherein the metal sleeve 33 with the passive temperature sensor has a smaller diameter than the metal sleeve 32 with the active temperature sensor.

As also in the case of the preceding examples of embodiments, in the present example of an embodiment, the metal sleeves 32, 33 sit on a sensor platform 39 and are connected in this platform with one another via a contact element, for example, a metal baseplate.

Superimposed on the sensor platform 39 is a cylindrical cap 34, which surrounds the metal sleeves 32, 33. Terminally, the cap 34 includes two openings, through which the metal sleeves 32 and 33 protrude. The plate-shaped element 37 of the cap 34 is bulged, respectively concavely embodied, so that the metal sleeves 32 and 33 extend slightly from the end of the cap 34. The two terminal openings are embodied in such a manner that circularly round slits 38 form between the metal sleeves 32 and 33 and the cap 34. Formed on the cap edge are additionally two openings 30a, 30b for sucking medium out from the interior of the cap 34.

Ideally, the angle of curvature is at least 1°, maximum 10°. The concave embodiment of the cap enables that especially flows of liquids with low flow velocities are directed to the end faces 35, 36 of the metal sleeves 32, 33, especially metal sleeve 32 with the active temperature sensor, and flow blockage at the wall of the cap is at least partially removed. The flow behavior produced thereby is shown in detail in FIG. 5e.

FIGS. 5a-e show different flow behaviors at the end face of the sensor in the case of slightly projecting or setback, metal sleeve, as well as arrangements with or without grooves between the metal sleeve and the sensor cap.

The invention claimed is:

1. A sensor of a thermal flow measuring device, comprising:
a sensor platform, which bears at least one measuring sensor element and a heated sensor element, each of said sensor elements is surrounded by a metal sleeve, which protrudes from said sensor platform; and
a plate-shaped element, which defines a plane, whose axis extends parallel to the axis of at least one of said metal sleeves, said plane is spaced from said sensor platform in the axial direction of said metal sleeve, wherein
said metal sleeve with said heated sensor element has a terminal end face;
said plate-shaped element is provided along said terminal end face of said metal sleeve with said heated sensor element for flow guidance;
at least 50% of a heating power required for said heated sensor element is given off as heat energy via said metal sleeve to a medium in a region, which is formed by said terminal end face; and
a sleeve wall section, which starting from said terminal end face lies in the first third of said metal sleeve.

2. The sensor as claimed in claim 1, wherein:
at least 70%, especially at least 80%, of the heating power required for said heated sensor element is given off as heat energy via said metal sleeve to a medium in a region, which is formed by said terminal end face and a sleeve wall section, which starting from said end face lies in the first third of said metal sleeve.

3. The sensor as claimed in claim 1, wherein:
at least 50% of the heating power required for said heated sensor element is given off as heat energy via said metal sleeve to a medium in a region, which is formed by said terminal end face and a sleeve wall section, which starting from said terminal end face lies in the first sixth of said metal sleeve.

4. The sensor as claimed in claim 1, wherein:
at least 25%, preferably at least 50%, especially preferably at least 80%, of said plate-shaped element is planar.

5. The sensor as claimed in claim 4, wherein:
said planar region is at an angle between 75-105°, preferably 85-95°, especially perpendicular, to the axis of said metal sleeve.

6. The sensor as claimed in claim 1, wherein:
said plate-shaped element is arranged relative to said at least one metal sleeve in such a manner that said plate-shaped element is spaced from said metal sleeve, especially in the axial direction, by less than a diameter, preferably less than a half diameter, of said metal sleeve.

7. The sensor as claimed in claim 1, wherein:
there is between said metal sleeve and said plate-shaped element a slit, especially an annular gap.

8. The sensor as claimed in claim 1, wherein:
the diameter of said plate-shaped element amounts to between 10-40 mm, preferably between 15-25 mm.

9. The sensor as claimed in claim 1, wherein:
said plate-shaped element is mounted on said sensor platform by one of:
a cylindrical wall and by rounded posts.

10. The sensor as claimed in claim 1, wherein:
said plate-shaped element is concave.

11. The sensor as claimed in claim 1, wherein:
the diameter of said metal sleeve with the heated sensor element is larger, preferably at least 1.5-times larger, then the diameter of said metal sleeve with said measuring sensor element.

12. A thermal flow measuring device including a sensor, for ascertaining mass flow of a liquid, said sensor comprising:
a sensor platform which bears at least one measuring sensor element and a heated sensor element, each of said sensor elements is surrounded by a metal sleeve, which protrudes from said sensor platform; and
a plate-shaped element, which defines a plane, whose axis extends parallel to the axis of at least one of said metal sleeves, said plane is spaced from said sensor platform in the axial direction of said metal sleeve, wherein:
said metal sleeve with said heated sensor element has a terminal end face;
said plate-shaped element is provided along said terminal end face of said metal sleeve with said heated sensor element for flow guidance;
at least 50% of a heating power required for said heated sensor element is given off as heat energy via said metal sleeve to a medium in a region, which is formed by said terminal end face; and
a sleeve wall section, which starting from said terminal end face lies in the first third of said metal sleeve.

* * * * *